(12) United States Patent
Wang et al.

(10) Patent No.: US 9,727,286 B2
(45) Date of Patent: Aug. 8, 2017

(54) ELECTRONIC DEVICE AND METHOD FOR OBTAINING PRINT PROCESSING TIME

(71) Applicants: PEKING UNIVERSITY FOUNDER GROUP CO., LTD., Beijing (CN); Peking University, Beijing (CN); Beijing Founder Electronics Co., Ltd., Beijing (CN)

(72) Inventors: Shuai Wang, Beijing (CN); Zhenhua Li, Beijing (CN); Zhihong Liu, Beijing (CN); Feng Chen, Beijing (CN)

(73) Assignees: PEKING UNIVERSITY FOUNDER GROUP CO., LTD., Beijing (CN); PEKING UNIVERSITY, Beijing (CN); BEIJING FOUNDER ELECTRONICS CO., LTD., Beijing (CN)

( * ) Notice: Subject to any disclaimer, the term of this patent is extended or adjusted under 35 U.S.C. 154(b) by 0 days.

(21) Appl. No.: 14/651,056

(22) PCT Filed: Nov. 1, 2013

(86) PCT No.: PCT/CN2013/086386
§ 371 (c)(1),
(2) Date: Jun. 10, 2015

(87) PCT Pub. No.: WO2014/094507
PCT Pub. Date: Jun. 26, 2014

(65) Prior Publication Data
US 2016/0139863 A1 May 19, 2016

(30) Foreign Application Priority Data
Dec. 20, 2012 (CN) .......................... 2012 1 0560704

(51) Int. Cl.
*G06F 3/12* (2006.01)
*G06F 11/34* (2006.01)

(52) U.S. Cl.
CPC .......... *G06F 3/1259* (2013.01); *G06F 3/1204* (2013.01); *G06F 3/1207* (2013.01);
(Continued)

(58) Field of Classification Search
CPC .... G06F 3/1259; G06F 3/1204; G06F 3/1207; G06F 3/1286; G06F 11/3485; G06F 11/3419; G06F 11/3476
(Continued)

(56) References Cited

U.S. PATENT DOCUMENTS

| 6,046,816 A | 4/2000 | Rawal et al. |
| 2002/0060805 A1 | 5/2002 | Tomita |

(Continued)

FOREIGN PATENT DOCUMENTS

| CN | 1684043 A | 10/2005 |
| EP | 1 096 364 A2 | 5/2001 |

OTHER PUBLICATIONS

Liu, Hui: Design and Implementation of printer monitoring module in inner network monitoring management system, *Electronic Technology & Information Science, China Master's Theses*—Full Text Database, Nov. 2009, No. 11, pp. 8-9 and 47-53, ISSN 1674-0246.
(Continued)

*Primary Examiner* — Benny Q Tieu
*Assistant Examiner* — Juan M Guillermety
(74) *Attorney, Agent, or Firm* — Brinks Gilson & Lione (57) ABSTRACT

Disclosed are a method for obtaining print processing time and an electronic device having a print function which can be connected with a printer. The method comprises: executing a print instruction to make the printer perform a print operation on a first file while the current system time of the
(Continued)

electronic device is recorded, referred to as time1; looking up in the print folder corresponding to the printer in the electronic device whether there is a second file with the extension .SPL corresponding to the first file; when the second file is found, reading the creation time of the second file, referred to as time2; detecting in the print folder that whether the second file has been modified to a third file; and when the second file is detected to have been modified to the third file, reading the modification time of the second file, referred to as time3.

14 Claims, 3 Drawing Sheets

(52) U.S. Cl.
CPC ........ *G06F 3/1286* (2013.01); *G06F 11/3419* (2013.01); *G06F 11/3485* (2013.01); *G06F 11/3476* (2013.01)

(58) Field of Classification Search
USPC ...................................... 358/1.14, 1.15, 1.16
See application file for complete search history.

(56) References Cited

U.S. PATENT DOCUMENTS

| | | | |
|---|---|---|---|
| 2002/0077783 A1 | 6/2002 | Awadalla | |
| 2004/0184071 A1* | 9/2004 | Garg | G06F 3/1205 358/1.15 |
| 2006/0173878 A1* | 8/2006 | Bley | G06F 17/30548 707/999.101 |
| 2007/0027828 A1* | 2/2007 | Komamura | G06F 17/30067 707/999.001 |
| 2011/0238981 A1* | 9/2011 | Nanaumi | H04L 63/0442 713/155 |

OTHER PUBLICATIONS

Extended European Search Report for EP 13864221.0-1954, dated Jul. 18, 2016.

\* cited by examiner

ELECTRONIC DEVICE AND METHOD FOR OBTAINING PRINT PROCESSING TIME

CROSS REFERENCE TO RELATED APPLICATIONS

The present application is a §371 national stage application of PCT International Application No. PCT/CN2013/086386, filed Nov. 1. 2013, which application claims a right of priority to Chinese Patent Application No. 201210560704.5, filed Dec. 20, 2012, both of which are incorporated herein by reference in their entirety.

TECHNICAL FIELD

The present invention relates to a field of an electronic device, and more specifically, to a method for obtaining print processing time and an electronic device having a print function.

BACKGROUND

As the digital print technology develops continuously, higher requirements are also imposed on work efficiency of a printer.

As people's requirements for the print quality increase continuously, a series of preprocessing often needs to be done before printing, such as color correction, grayscale control, image compression, etc. Moreover, for a more simple operation flow and also for a more clear recognition of efficiency of preprocessing in order to improve the preprocessing algorithm and the flow, it is necessary to record consumed time of preprocessing and consumed time when the preprocessed print job is interpreted by the printer.

In general, these processing time needs to be measured manually by a test operator. Moreover, the test operator records timing when the preprocessing is started, timing when the preprocessing is completed and timing when the printer completes interpreting the print, etc by checking a system clock or a watch, then obtains consumed time of each process by calculation.

However, in the course of implementing technical solutions in embodiments of the present application, the inventors of the present application find that there are at least the following technical problems in the above mentioned technology:

Since the electronic device does not automatically record any timing related to the print process in the course of the print processing, the electronic device can not obtain timing of processing information in the print process, which in turn makes it impossible to make a quick analysis of the print process and solve technical problems according to consumed time of the print process.

Meanwhile, it makes a user to have a poor experience when he/she uses the electronic device having the print function.

SUMMARY

By providing a method for obtaining print processing time and an electronic device having a print function, embodiments of the present application solve the technical problem in the prior art that since the electronic device does not automatically record any timing related to the print process in the course of the print processing, the electronic device can not obtain timing of processing information in the print process, thereby achieving the technical effect of automatically recording time of the print process quickly and efficiently.

An embodiment of the present application provides a method for obtaining a print processing time, the method being applied to an electronic device having a print function and being connected with a printer, the method comprises: executing a print instruction to make the printer perform an operation of printing a first file while recording the current system time of the electronic device as time1; looking up in a print folder in the electronic device corresponding to the printer whether there is a second file containing preprocessing information after performing a print task preprocessing and corresponding to the first file; when the second file is found, reading out the creation time of the second file and recording it as time2; detecting in the print folder whether the second file has been modified; when the second file is detected to have been modified, reading out the modification time of the second file and recording it as time3.

In one embodiment, the extension of the second file is .SPL.

Further, before executing the print instruction, the method further comprises: looking up in the print folder whether there is a file with an extension of .SPL; when it is found that there is the file with the extension of .SPL, deleting the file with the extension of .SPL.

Further, after reading out the creation time of the second file, referred to as time2, the method further comprises: recording the time interval between the time2 and the time1 as timespan1.

Further, the step of, when the second file is detected to have been modified, reading out the modification time of the second file, referred to as time3, specifically comprises: detecting whether the modification time of the second file is the creation time time2 of the second file; when the modification time of the second file is the creation time time2 of the second file, reading out the modification time of the second file periodically; when the modification time of the second file is not the creation time time2 of the second file, recording the modification time of the second file as time3.

Further, after reading out the modification time of the second file and recording it as time3, the method further comprises: recording the time interval between the modification time time3 of the second file and the creation time time2 of the second file as timespan2.

Further, after recording the time interval between the modification time time3 of the second file and the creation time time2 of the second file as timespan2, the method further comprises: in a newly created log file, combining and recording one or more data recorded in the print process which includes time1, time2, time3, timespan1 and timespan2.

An embodiment of the present application provides the following technical solution: An electronic device having a print function, comprises: an instruction execution module for executing a print instruction to make the printer perform an operation of printing a first file while recording the current system time of the electronic device as time1; a first look up module for looking up in a print folder corresponding to the printer in the electronic device whether there is a second file containing preprocessing information after performing a print task preprocessing and corresponding to the first file; a first read module for, when the second file is found, reading out the creation time of the second file and recording it as time2; a first detect module for detecting in the print folder whether the second file has been modified;

and a second read module for, when the second file is detected to have been modified, reading out the modification time of the second file and recording it as time3.

In one embodiment, the extension of the second file is .SPL.

Further, the electronic device further comprises: a pre-look-up module for looking up in the print folder whether there is a file with an extension of .SPL; and a delete module for, when it is found that there is the file with the extension of .SPL, deleting the file with the extension of .SPL.

Further, the electronic device further comprises: a first record module for recording the time interval between the time2 and the time1 as timespan1.

Further, the second read module specifically comprises: a second detect sub-module for detecting whether the modification time of the second file is the creation time time2 of the second file; a circular read sub-module for, when the modification time of the second file is the creation time time2 of the second file, reading out the modification time of the second file periodically; and a second record sub-module for, when the modification time of the second file is not the creation time time2 of the second file, recording the modification time of the second file as time3.

Further, the electronic device further comprises: a third record module for recording the time interval between the modification time time3 of the second file and the creation time time2 of the second file as timespan2.

Further, the electronic device further comprises: a log file record module for combining and recording one or more data recorded in the print process which includes time1, time2, time3, timespan1 and timespan2.

An embodiment of the present application provides the following technical solution: a computer readable medium storing a computer program thereon, which, when executed in an electronic device having a print function that can be connected with a printer, causes the electronic device to perform the following processing: executing a print instruction to make the printer perform an operation of printing a first file while recording the current system time of the electronic device as time1; looking up in a print folder in the electronic device corresponding to the printer whether there is a second file containing preprocessing information after performing a print task preprocessing and corresponding to the first file; when the second file is found, reading out the creation time of the second file and recording it as time2; detecting in the print folder whether the second file has been modified; when the second file is detected to have been modified, reading out the modification time of the second file and recording it as time3.

One or more technical solutions provided in embodiments of the present application have at least the following technical effects or advantages:
1. Since the start timing of performing the print task, the creation timing of the second file corresponding to the first file and the modification timing when the second file is modified are recorded automatically by the software system, the technical problem in the prior art that since the electronic device does not automatically record any timing related to the print process in the course of the print processing, it can not obtain timing of processing information in the print process, is solved effectively, thereby achieving the technical effect of automatically recording timing of the print process quickly and efficiently.
2. Since the consumed time of the print preprocessing and the consumed time of the printer interpreting the print task are recorded in the log file, the technical problem in the prior art that the electronic device can not obtain the consumed time of the print preprocessing and the consumed time of the printer interpreting the print task and it can not perform an analysis and necessary improvement on the print process is solved effectively, thereby achieving the technical effect of obtaining the consumed time efficiently with high precision and performing real time monitoring on the electronic device according to the consumed time for providing data references for technical improvement.

DETAILED DESCRIPTION

By providing a method for obtaining print processing time and an electronic device having a print function, embodiments of the present application solve the technical problem in the prior art that since the electronic device does not automatically record any timing related to the print process in the course of the print processing, the electronic device can not obtain timing of processing information in the print process, thereby achieving the technical effect of automatically recording time of the print process quickly and efficiently.

The technical solution in an embodiment of the present application is intended to solve the above mentioned technical problem of not recording any timing of the print process in the course of the print processing, and the overall concept thereof is as follows:

After the user submits a print task, the software system in the electronic device will record timing of submitting the task as time1; after the software system performs a preprocessing on the task to be printed, a file with an extension of e.g. .SPL is generated. At this time, the software system will record the creation time of the *.SPL file as time2, i.e. timing when the print preprocessing is completed; the modification time of the *.SPL file is read periodically. When the modification time is different from the creation time of the *.SPL file, this modification time of the *.SPL file is recorded as time3, i.e. timing when the printer completes interpreting the print task. Meanwhile, the software also records consumed time of preprocessing of the print process, i.e. the difference value between time2 and time1; the software also records consumed time of the process of the printer interpreting the print task, i.e. the different value between time3 and time2. This facilitates subsequent improvement and enhancement of efficiency of the print preprocessing and the printer interpreting the print preprocessing.

In order to understand the above mentioned technical solution better, hereinafter, the above mentioned technical solution will be explained in detail in conjunction with the drawings and detailed embodiments.

Figure 1:
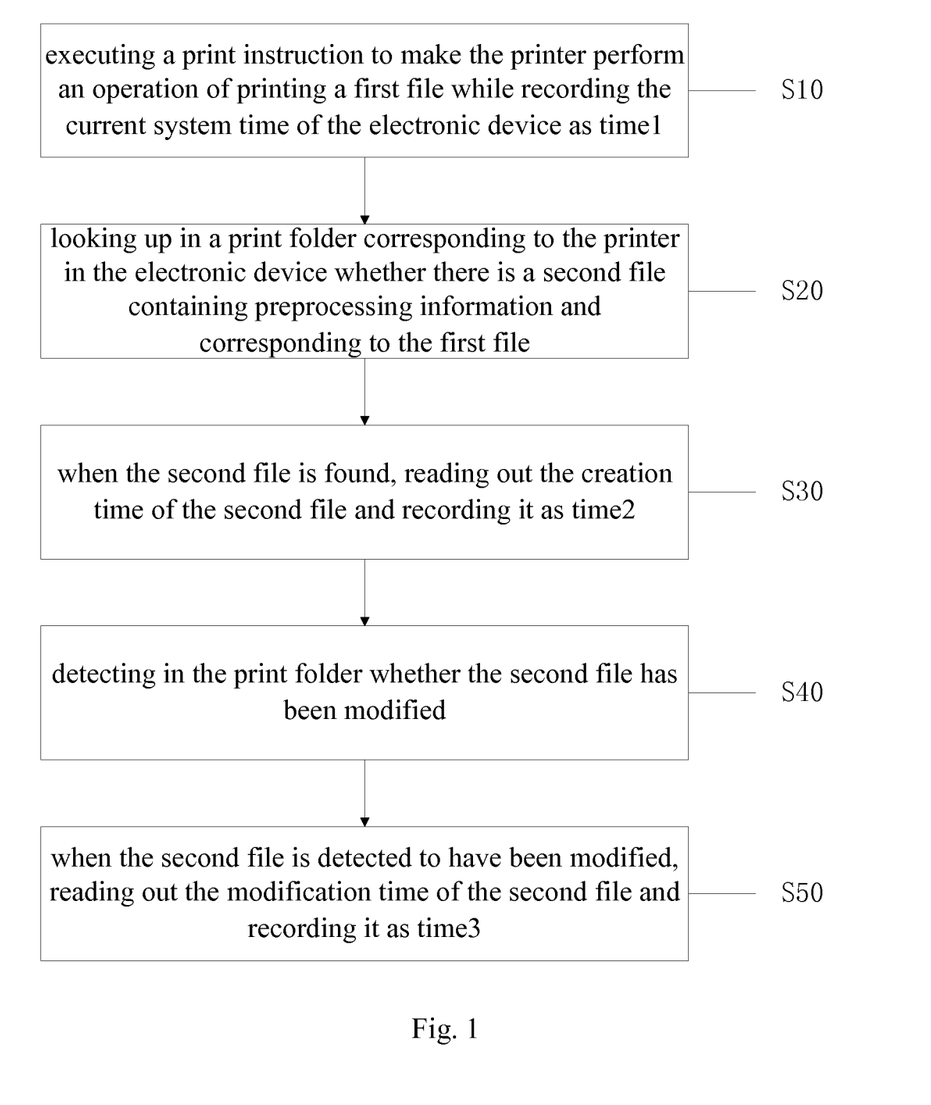
FIG. 1 is a flowchart of a method for obtaining print processing time in an embodiment of the present application.

An embodiment of the present application is for example shown in FIG. 1, which is a flowchart of a method for obtaining print processing time provided by an embodiment of the present application. The method is applied to an electronic device having a print function, wherein the electronic device can be connected with a printer, the method comprises:

S10, executing a print instruction to make the printer perform an operation of printing a first file while recording the current system time of the electronic device, referred to as time1;

S20, looking up, in a print folder corresponding to the printer in the electronic device, whether there is a second file that corresponds to the first file and contains preprocessing information (e.g. with an extension of .SPL) after performing print task preprocessing;

S30, when the second file is found, reading the creation time of the second file, referred to as time2;

S40, detecting in the print folder whether the second file has been modified;

S50, when it is detected that the second file has been modified, reading the modification time of the second file, and recorded as time3.

In the embodiment of the present application, before S10, i.e. before executing the print instruction, the method further comprises: looking up in the print folder whether there is a file with an extension of .SPL; when it is found that there is a file with an extension of .SPL, deleting the file with the extension of .SPL.

Hereinafter, a detailed implementation of the method in the embodiment of the present application will be described in conjunction with detailed examples:

In the detailed implementation, since the computer may have stored data information related to consumed time of the print process, which was probably left after executing the previous print task and has an effect on currently recording data information of consumed time of the print task process, it is necessary to firstly find the printer temporary folder under the system disc of the computer connected to the printer and then look up a file with an extension of .SPL in the printer temporary folder. For example, taking Windows™ operating system as an example, it is necessary to look up a folder "C:\WINDOWS\system32\spool\PRINTERS" in the computer, and then look up under the folder whether there is a file with an extension of .SPL. After such a file is found, the *.SPL file is deleted. If the *.SPL file stored under the printer temporary folder is not deleted before executing the print instruction, it may affect data recording of the subsequent print processing. Of course, in other operating systems such as iOS, Unix, Linux, etc, it is possible to look up a file that plays the same role as the file with the extension of .SPL in a corresponding directory and delete the file.

After deleting the *.SPL file, the method in the embodiment of the present application proceeds with S10, executes a print instruction to make the printer perform an operation of printing a first file while recording the current system time of the electronic device, referred to as time1.

In the detailed implementation, the print instruction is sent by the user clicking a "print" button, this timing is the start timing of performing the print task, and at the same time, it is also the start timing of performing the print preprocessing. For example, the timing when the user clicks the "print" button is 14:23:11 on Nov. 10, 2012, the electronic device uses software to detect that the current system time is 14:23:11 on Nov. 10, 2012 and records the current timing in a newly created log file.

After the timing of the print instruction is recorded, the method executes step S20, which looks up in a print folder corresponding to the printer in the electronic device whether there is a second file containing preprocessing information (e.g. with an extension of .SPL) after performing print task preprocessing and corresponding to the first file.

In the detailed implementation, this step is the same as looking up the *.SPL file before step S10. However, in this step, it is necessary to find the *.SPL file in the printer temporary folder under the system disc of the electronic device, that is, look up the *.SPL file under the folder "C:\WINDOWS\system32\spool\PRINTERS". If the *.SPL file is not found in the temporary processing folder, it is possible that submitting the print task is successful but the print preprocessing is not successful or that submitting the print task is successful but the print preprocessing is ongoing. For the first case, it is necessary to re-submit the print task; for the second case, it is necessary to wait and look up the *.SPL file under the temporary folder periodically until the *.SPL file is found. Since, after the print task is submitted, the software in the electronic device will generate a file such as *.SPL after it performs preprocessing on the print task successfully. The file contains preprocessing information after performing preprocessing on the print task and the preprocessing information will be used in subsequent steps. Therefore, if there is already a *.SPL file in the printer temporary folder before submitting the current print task, this file needs to be deleted to avoid affecting the current print task.

After looking up in the printer temporary folder whether there is the *.SPL file, i.e. looking up the second file corresponding to the first file, the method executes step S30. When the second file is found, the creation time of the second file is read out, referred to as time2.

In the detailed implementation, the creation time of the *.SPL file is the time when the print preprocessing is completed. For example, the file found in the above mentioned folder is a 001.SPL file, the creation time of the 001.SPL file is 14:23:46 on Nov. 10, 2012, the current timing is recorded in the above newly created log file and is recorded in the field of the creation time of the 001.SPL file.

After the creation time of the *.SPL file is recorded, the method for obtaining print processing time further comprises: recording the time interval between the time2 and the time1 as timespan1.

In the detailed implementation, the difference between the creation timing time2 of the *.SPL file and the timing time1 of executing the print instruction is calculated, and the obtained difference is the consumed time timespan1 of the whole preprocessing. According to the above mentioned example, in this step, the obtained consumed time of the print preprocessing is the difference between 14 h:23 m:46 s and 14 h:23 m:11 s, i.e. 35 seconds. Therefore, the consumed time of the print preprocessing is 35 seconds. The consumed time of the whole preprocessing is the work done by the software of the electronic device. The software will perform correction preprocessing on the content to be printed in the submitted print task, e.g. color correction, grayscale adjustment, image size correction, etc. The software only analyzes and records the attributes which need to be adjusted. The preprocessing is only the preprocessing before the printer performs printing and does not perform any substantial adjustment on the content to be printed, but only analyzes and records data in the content to be printed which need to be corrected to make it satisfy the requirement of printing the content.

After the consumed time of the preprocessing is recorded, the method executes step S40, detects in the print folder whether the second file has been modified.

Detecting whether the second file has been modified is done by detecting whether the modification time of the second file is the same as the creation time of the second file. When it is detected that the modification time of the second file is the same as the creation time time2 of the second file, the second file is considered to not have been modified. When it is detected that the modification time of the second file is different from the creation time time2 of the second file, the second file is considered to have been modified.

The method proceeds with step S50. When the second file is detected to have been modified, the modification time of the second file is read out, referred to as time3.

In step S50, the detail step of recording the time time3 are as follows: first, detect whether the modification time of the second file is the creation time time2 of the second file; when the modification time of the second file is the creation time time2 of the second file, read the modification time of the second file periodically; when the modification time of the second file is not the creation time time2 of the second file, record the modification time of the second file as time3.

In the detailed implementation, only when the modification time of the *.SPL file is different from the creation time of the *.SPL file, the modification time of the *.SPL file is read out and recorded. For example, the creation time of the above mentioned *.SPL file is 14 h:23 m:46 s on Nov. 10, 2012. If the modification time of the *.SPL file is also 14 h:23 m:46 s on Nov. 10, 2012, the *.SPL file is considered to not have been modified, and the modification time of the *.SPL file is continued to be read out periodically. When the modification time of the *.SPL file is 14 h:23 m:59 s on Nov. 10, 2012, the *.SPL file is considered to have been modified, the present timing is recorded in the above newly created log file and is recorded in the field of the modification time of the *.SPL file.

After the modification time of the *.SPL file is recorded, the method for obtaining print processing time further comprises: recording the time interval between the modification time time3 of the second file and the creation time time2 of the second file as timespan2.

In the detailed implementation, the time interval between the modification time of the *.SPL file and the creation time of the *.SPL file is the consumed time for the printer to interpret the print task, that is, the process of delivering the preprocessed print task to the printer to performed. The printer will print the preprocessed print task, the obtained print result achieves a better print effect. In the example as mentioned above, the creation time of the *.SPL file obtained in the printer temporary folder is 14 h:23 m:46 s on Nov. 10, 2012, the modification time of the *.SPL file is 14 h:23 m:59 s on Nov. 10, 2012, and the consumed time for the printer to interpret the print task is the difference between 14 h:23 m:59 s and 14 h:23 m:46 s, i.e. 13 seconds. In this period of time, the printer will interpret the print task which has been preprocessed (such as color correction, grayscale adjustment, image compression, etc), so as to achieve the print effect which the printer needs to output.

The above recorded data may be recorded in combination. In the newly created log file, one or more data recorded during the print process (including time1, time2, time3, timespan1 and timespan2) are combined and recorded.

In the detailed implementation, for example, when the user only needs to learn about the consumed time of the print preprocessing to detect the efficiency of the consumed time of the print preprocessing and does not need to perform an efficiency analysis on the process of the printer interpreting the print task, only time1, time2 and timespan1 may be recorded in the newly created log file; or when the user only needs to learn about the consumed time for the printer to interpret the print task and does not need to perform an efficiency analysis on the consumed time of the printer preprocessing, only time2, time3 and timespan2 may be recorded in the newly created log file. Regarding what kinds of records are combined specifically, no limitation is made in the embodiment of the present application.

After all data during the print processing are recorded, the modified .SPL file which is found in step S50 will be deleted automatically after the print task is completed. So it will not affect the process of recording the print processing time in the next time.

Of course, data recorded in the above newly created log file is provided to the user to perform an analysis and improvement on the software of the print preprocessing and the efficiency of the printer interpreting the print task. For example, when the consumed time of the print preprocessing recorded in the log file of the print task is long, for example, initially, the consumed time of the print preprocessing is 30 seconds, since the software is used for a long time, the performance etc of the software is degraded. If the consumed time of the print preprocessing shown in the currently recorded data is 50 seconds, it is considered that the current consumed time of the print preprocessing is longer than the previous consumed time, or the software that processes the print preprocessing task malfunctions which degrades the efficiency of the print preprocessing. In both cases, the software of the print preprocessing may be improved and updated to improve the efficiency of the print preprocessing. For example, when the consumed time of the printer interpreting the print task recorded in the log file of the print task is long (of course, the consumed time for the printer to interpret the print task is also related to the amount of the content to be printed), the average consumed time for a certain amount of content to be printed may be recorded. For example, when a printer is initially used, the average consumed time for a certain amount of content to be printed is 13 seconds. If the average consumed time for the printer to interpret the print task is currently detected as 20 seconds, the difference with the previous 13 seconds is 7 seconds which exceeds a predetermined difference threshold of 5 seconds, and the printer needs to be updated and improved.

Figure 2:
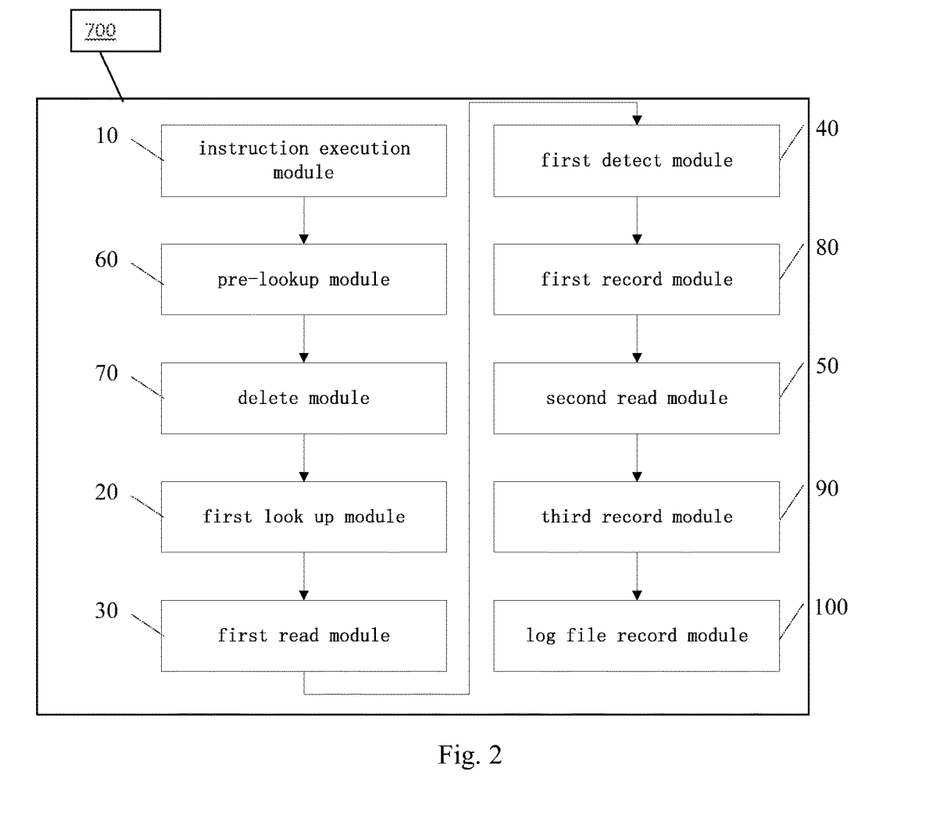
FIGS. 2 and 3 are module diagrams of an electronic device having a print function in an embodiment of the present application.

FIG. 2 illustrates an electronic device, such as a processor 700, having a print function in an embodiment of the present application. As shown in the figure, the electronic device comprises: an execution instruction module 10 for executing a print instruction to make the printer perform an operation of printing a first file while recording the current system time of the electronic device, referred to as time1; a first look up module 20 for looking up, in a print folder corresponding to the printer in the electronic device, whether there is a second file containing preprocessing information (e.g. with an extension of .SPL) after performing print task preprocessing an corresponding to the first file; a first read module 30 for, when the second file is found, reading out the creation time of the second file, referred to as time2; a first detect module 40 for detecting in the print folder whether the second file has been modified; and a second read module 50 for, when the second file is detected to have been modified, reading out the modification time of the second file, referred to as time3.

The electronic device further comprises: a pre-look-up module 60 for looking up in the print folder whether there is a file with an extension of .SPL; a delete module 70 for deleting the file with the extension of .SPL when the file with the extension of .SPL is found.

The electronic device further comprises: a first record module 80 for recording the time interval between the time2 and the time1 as timespan1.

Figure 3:
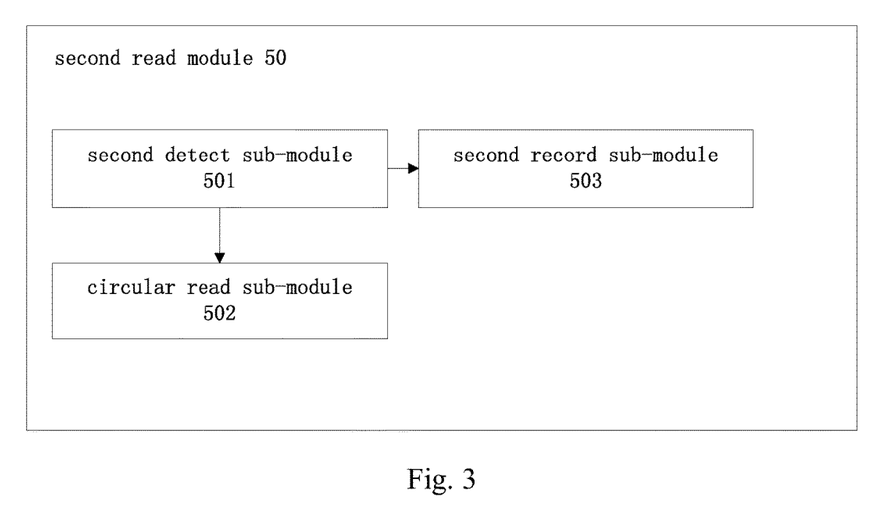

The second read module 50 specifically comprises: a second detect sub-module 501 for detecting whether the modification time of the second file is the creation time time2 of the second file; a circular read sub-module 502 for reading out the modification time of the second file circularly (or periodically) when the modification time of the second file is the creation time time2 of the second file; a second record sub-module 503 for recording the modification time of the second file as time3 when the modification time of the second file is not the creation time time2 of the second file.

The electronic device further comprises: a third record module 90 for recording the time interval between the modification time time3 of the second file and the creation time time2 of the second file as timespan2.

Finally, the electronic device further comprises: a log file record module 100 for combining and recording one or more data recorded during the print process which includes time1, time2, time3, timespan1 and timespan2.

One or more technical solutions provided in embodiments of the present invention have at least the following technical effects or advantages:

1. since the start timing of performing the print task, the creation timing of the second file corresponding to the first file and the modification timing when the second file is modified are recorded automatically by the software system, the technical problem in the prior art that since the electronic device does not automatically record any timing related to the print process in the course of the print processing, it can not obtain timing of processing information in the print process, is solved effectively, thereby achieving the technical effect of automatically recording timing of the print process quickly and efficiently.
2. since the consumed time of the print preprocessing and the consumed time of the printer interpreting the print task are recorded in the log file, the technical problem in the prior art that the electronic device can not obtain t the consumed time of the print preprocessing and the consumed time of the printer interpreting the print task, and it can not perform an analysis and necessary improvement on the print process is solved effectively, thereby achieving the technical effect of efficiently obtaining the consumed time with high precision, and performing real time monitoring on the electronic device according to the consumed time may provide data parameters for technical improvement.

It will be appreciated by those skilled in the art that, the embodiments of the invention can be provided in the form of method, system or computer program product. Therefore, the invention may take the forms of pure hardware embodiment, pure software embodiment, or combined hardware and software embodiment. Furthermore, the invention may take the forms of computer program product embodied on one or more computer usable storage medium (including, but not limited to, magnetic disk storage, CD-ROM, optical storage, etc) having computer usable program code contained therein.

The invention has been described with reference to the flowchart and/or block diagram of method, apparatus (system) and computer program product according to an embodiment of the invention. It should be understood that each flow and/or block in the flowchart and/or block diagrams and the combination of blocks in the flowchart and/or block diagram can be implemented by computer program instructions. These computer program instructions can be provided to the processor of general purpose computer, dedicated computer, embedded processor or other programmable data processing apparatus to generate a machine, so that the instructions (by the processor of computer or other programmable data processing apparatus) generate a means for implementing the functions provided in one or more blocks of the flowchart and/or block diagram.

These computer program instructions can also be stored in readable memories of one or more computers, each of such memories can instruct computer or other programmable data processing apparatus to put into effect in a particular manner, so that the instructions stored in computer readable memory produce a manufacture article. The instruction device implements functions specified in one ore more flows of the flowchart and/or one or more blocks of the block diagram.

The computer program instructions can also be loaded into a computer or other programmable data processing apparatus such that a series of operation steps is executed on the computer or other programmable data processing apparatus to produce a computer-implemented process, thereby the instructions executed on the computer or other programmable data processing apparatus provide steps for implementing the functions specified in one ore more flows of the flowchart and/or one or more blocks of the block diagram.

While the preferred embodiments of the present invention have been described, once those skilled in the art learn about the basic inventive concepts, additional changes and modifications may be made in these embodiments. Therefore, the appended claims are intended to be construed to cover preferred embodiments and all changes and modifications within the scope of the invention.

Obviously, those skilled in the art may make any modification and variation to the invention without departing from the spirit and scope of the invention. Therefore, if these modifications and variations of the invention are within the scope of the claims of the invention and equivalent thereof, the invention is also intended to cover these modifications and variations.

What is claimed is:

1. A method for obtaining a print processing time which is applied to an electronic device having a print function, wherein the electronic device can be connected with a printer, wherein the method comprises:
   executing a print instruction to make the printer perform an operation of printing a first file while recording a current system time of the electronic device as time1;
   looking up in a print folder in the electronic device corresponding to the printer whether there is a second file containing preprocessing information corresponding to the first file;
   when the second file is found, reading out a creation time of the second file and recording it as time2;
   detecting in the print folder whether the second file has been modified; and
   when the second file is detected to have been modified, reading out a modification time of the second file and recording it as time3, and detecting whether the modification time of the second file is the time2, wherein when the modification time of the second file is the time2, the modification time of the second file is read out periodically, and when the modification time of the second file is not the time2, the modification time of the second file is recorded as time3.

2. The method according to claim 1, wherein a filename extension of the second file is .SPL.

3. The method according to claim 2, wherein, before executing the print instruction, the method further comprises:
   looking up in the print folder whether there is a file with a filename extension of .SPL; and when it is found that there is the file with the filename extension of .SPL, deleting the file with the filename extension of .SPL.

4. The method according to claim 1, wherein, after reading out the creation time of the second file, recorded as time2, the method further comprises:
recording a time interval between the time2 and the time1 as timespan1.

5. The method according to claim 1, wherein, after reading out the modification time of the second file and recording it as time3, the method further comprises:
recording the time interval between the time3 and the time2 as timespan2.

6. The method according to claim 5, wherein after recording the file time interval between the time3 and the time2 as timespan2, the method further comprises:
in a newly created log file, combining and recording one or more data recorded in the print process which includes time1, time2, time3, timespan1 and timespan2.

7. An electronic device having a print function, wherein the electronic device comprises a processor which is configured to:
execute a print instruction to make the printer perform an operation of printing a first file while recording the current system time of the electronic device as time1;
look up in a print folder corresponding to the printer in the electronic device whether there is a second file containing preprocessing information corresponding to the first file;
when the second file is found, read out the creation time of the second file and record it as time2;
detect in the print folder whether the second file has been modified;
when the second file is detected to have been modified, read out a modification time of the second file and record it as time3, and detecting whether the modification time of the second file is the time2, wherein when the modification time of the second file is the time2, the modification time of the second file is read out periodically, and when the modification time of the second file is not the time2, the modification time of the second file is recorded as time3.

8. The electronic device according to claim 7, wherein a filename extension of the second file is .SPL.

9. The electronic device according to claim 8, wherein the processor is further configured to:
look up in the print folder whether there is a file with the filename extension of .SPL; and
when it is found that there is the file with the filename extension of .SPL, delete the file with the filename extension of .SPL.

10. The electronic device according to claim 7, wherein the processor is further configured to:
record a time interval between the time2 and the time1 as timespan1.

11. The electronic device according to claim 7, wherein the processor is further configured to:
record a time interval between the time3 and the time2 as timespan2.

12. The electronic device according to claim 11, wherein processor is further configured to:
combine and record one or more data recorded in the print process, the one or more data including one or more of time1, time2, time3, timespan1 and timespan2.

13. A non-transitory computer readable medium having a computer program thereon, which, when executed in an electronic device having a print function that can be connected with a printer, causes the electronic device to perform the following processing:
executing a print instruction to make the printer perform an operation of printing a first file while recording a current system time of the electronic device as time1;
looking up in a print folder in the electronic device corresponding to the printer whether there is a second file containing preprocessing information corresponding to the first file;
when the second file is found, reading out a creation time of the second file and recording it as time2;
detecting in the print folder whether the second file has been modified;
when the second file is detected to have been modified, reading out a modification time of the second file and recording it as time3, and detecting whether the modification time of the second file is the time2, wherein when the modification time of the second file is the time2, the modification time of the second file is read out periodically, and when the modification time of the second file is not the time2, the modification time of the second file is recorded as time3.

14. The non-transitory computer readable medium of claim 13, wherein after recording the file time interval between the time3 and the time2 as timespan2, the processing further comprises:
in a newly created log file, combining and recording one or more data recorded in the print process which includes time1, time2, time3, timespan1 and timespan2.

* * * * *